W. W. JEROME, S. B. ALGER & C. H. SAGE.
FRICTION CLUTCH.

No. 109,740. Patented Nov. 29, 1870.

UNITED STATES PATENT OFFICE.

WALTER W. JEROME, SAMUEL B. ALGER, AND CLINTON H. SAGE, OF NORWICH, NEW YORK.

IMPROVEMENT IN FRICTION-CLUTCHES.

Specification forming part of Letters Patent No. 109,740, dated November 29, 1870.

*To all whom it may concern:*

Be it known that we, WALTER W. JEROME, SAMUEL B. ALGER, and CLINTON H. SAGE, of Norwich, in the county of Chenango and State of New York, have invented a new and useful Improvement in Friction-Clutch; and we do hereby declare that the following is a full, clear, and exact description thereof, which will enable others skilled in the art to make and use the same, reference being had to the accompanying drawings, forming part of this specification, in which—

Figure 1:
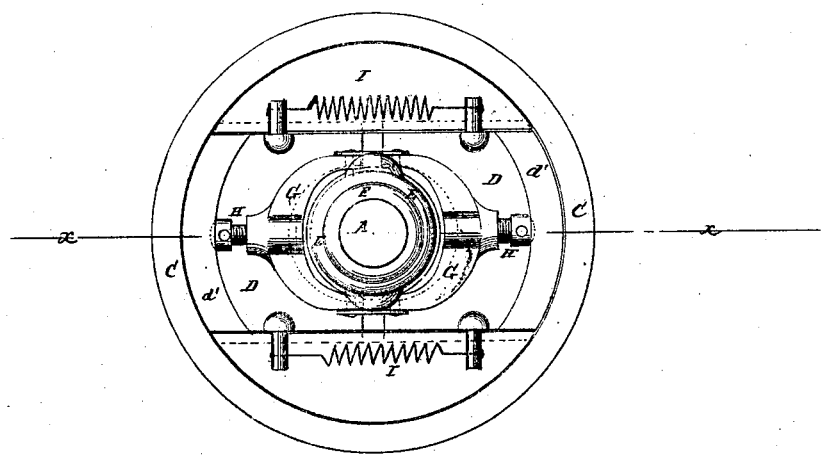
Figure 2:
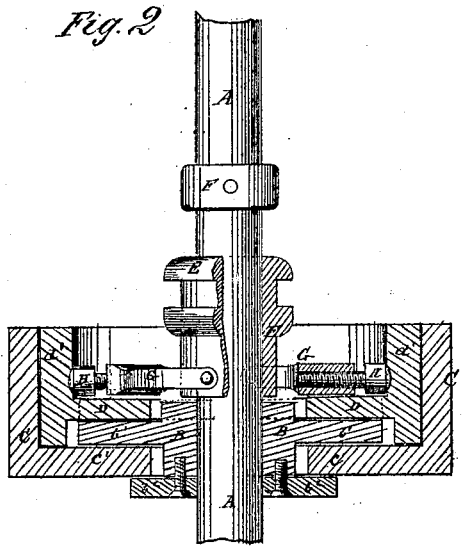

Figure 1 represents our improved clutch as attached to a shaft and pulley. Fig. 2 is a detail sectional view of the same, taken through the line $x\ x$, Fig. 1.

Similar letters of reference indicate corresponding parts.

Our invention has for its especial object to furnish an improved friction-clutch which shall be so constructed as to connect a twelve-inch pulley to a three-inch shaft, but which shall be equally applicable in cases where the ratio between the diameters of the shaft and pulley shall be either greater or less than one-fourth; and it consists in the construction and combination of various parts of the clutch, as hereinafter more fully described.

A is the shaft, to which is keyed or otherwise secured the hub B, upon which the pulley C runs loosely. The pulley C is kept in place upon the hub B by the disk or flange $b'$, formed upon said hub, and by the disk $b^2$, secured to it, between which two flanges the disk or body $c'$ of the pulley C enters, as shown in Fig. 2. The outer side of the disk or flange $b'$ of the hub B has a wide dovetailed groove formed in it, in which slide the plates D, upon the outer edges of which are formed flanges or segmental rims $d'$, curved to correspond with the curve of the pulley C, against the inner surface of the rim of which the said flanges are pressed to connect the shaft and pulley with each other, so that they may move together.

E is a sleeve, placed upon the shaft A at the outer end of the hub B, and the movement of which is limited by a collar, F, adjustably attached to said shaft A. The outer part of the sleeve E is grooved, as shown in Fig. 2, to receive the forked end of the operating-lever. To the opposite sides of the inner end of the sliding sleeve E are pivoted the ends of two curved arms, G.

H are screws screwed into the central part of the outer side of the arms G, the outer ends of which enter sockets in the inner sides of the central parts of the flanges or rims $d'$ of the slides D, as shown in Figs. 1 and 2. By this construction, as the sleeve E is moved toward the hub B, the arms G act as levers or toggle-joints to force the slides D $d'$ against the rim of the pulley C. As the sleeve E is drawn back toward the collar F, the slides D are withdrawn from the pulley C by the springs I, placed one upon each side of the shaft A, and connected with the two slides D, or with pins attached to or projections formed upon said slides.

By turning the screws H, the clutch may be adjusted to press with greater or less force against the pulley C, or to take up the wear upon said slides and pulley.

Having thus described our invention, we claim as new and desire to secure by Letters Patent—

The pivoted curved arms G and adjusting-screws H, or equivalent, in combination with the slides D $d'$, springs I I, sleeve E, hub B, and pulley C, substantially as herein shown and described, and for the purpose set forth.

WALTER W. JEROME.
SAMUEL B. ALGER.
CLINTON H. SAGE.

Witnesses:
HENRY L. HINCKLEY,
DEFORREST A. WILLCOX.